Patented Aug. 16, 1938

2,127,140

UNITED STATES PATENT OFFICE 2,127,140

PROCESS FOR DEMULSIFYING CUT OILS AND THE LIKE

Harold Jay Robertson, Tulsa, Okla., assignor to Sinclair Refining Company, New York, N. Y., a corporation of Maine No Drawing. Application December 29, 1934, Serial No. 759,767

4 Claims. (Cl. 196—4)

In the operation of oil wells there is commonly produced, in addition to the crude petroleum, a greater or less amount of emulsion in which oil is the continuous phase and brine or water in minute globules the dispersed phase. These emulsions are commonly known as "cut" or "roily" oils or "bottom settlings" and are of little or no value as such. It has long been a practice in the oil field and at refining plants to treat these emulsions with so-called emulsion breakers to separate the brine or water from the oil to render the latter available for use. Among the more or less successful emulsion breakers are water softening agents such as soluble soaps, fatty acids, rosin soaps and fatty substances, which are used with or without various other additions, by mixing in small proportions with the emulsions to be freed of brine. It is generally recognized that in the treatment of such emulsions with water softening agents of the type exemplified above, the separation of the water from the oil is effected by the penetration of the water softening agent to the water of the droplets through the interface or envelope of mineral emulsion agents surrounding the droplets and by which the drops are held in suspension in the oil, and that the water softening agents in some manner neutralize or oppose the emulsifying effect of such agents, or dissipate them, thus releasing the water or brine which is precipitated from the oil. In such emulsions there are usually or invariably contained in the water of the dispersed phase, or in the emulsifying agent, or both, a salt or salts of the alkaline earths. These salts when treated with soluble soap or the like, as in the above-mentioned emulsion breakers, form soaps which are insoluble in the brine or water of the emulsion and also insoluble, or at most, only very sparingly soluble, in the petroleum oil after demulsification. Consequently these insoluble soaps are often found as an insoluble layer at the interface between the upper or oil layer and the lower or brine layer in the settling tank after the emulsion has been broken, and frequently they appear suspended as a haze in the treated oil, requiring considerable washing of the oil with water to remove them. In some instances, the insoluble soaps accumulate to such an extent in the settling tank that they are carried over into the stock tank and contaminate the oil with bottom sediment.

My invention has for its object the elimination of such insoluble layers between the water and the supernatant oil and/or the haze in the oil occasioned by the presence of insoluble soaps therein. This I accomplish by incorporating in the demulsifier used, a reagent capable of dissolving insoluble soaps and forming a solution thereof which is itself soluble in the oil produced from the emulsion. I have found that cyclohexanol or, as it is otherwise known, hexahydrophenol is a satisfactory reagent for the purpose and that when present in suitable proportion in the emulsion with the water softening agent, any insoluble soap formed by the latter dissolves completely in the petrolum, producing a clear oil and leaving no insoluble layer at the interface between the separated oil and brine and also that the above-mentioned haze is prevented. Thus, any final washing step to clean the oil is dispensed with and danger of accumulating an intermediate layer of insoluble soap in the wash or settling tank is eliminated. I have further found that incorporation of cyclohexanol with such demulsifying compounds aids materially in accelerating the water break or separation, which is particularly desirable when the water phase is excessive and requires separation of the major parts before heating or washing or when the emulsion is of buttery consistency and difficult to handle in the gas separator.

While the addition of cyclohexanol to any water softening composition containing soluble soap or the like (including rosin soap), fatty oils, etc., greatly improves the efficiency thereof as a demulsifier, I have found it of especial value as an addition to an emulsion breaking compound, described and claimed in an application filed by me December 12, 1934, Serial No. 757,215, which includes in addition to soluble soaps or the like, an aldehyde or ketone alkali hydrogen sulphite.

As a specific example of an emulsion breaking compound embodying the present invention, I shall describe the preparation of the compound of said companion application and the addition of cyclohexanol thereto.

I separately prepare a solution of an aldehyde or ketone alkali hydrogen sulphite, as described in said copending application, preferably furfural potassium hydrogen sulphite, and I also separately prepare the water softening agent, preferably an ammonia soap of ricinoleic acid to which may be added fatty matter such as castor oil or other low test fixed oil.

The water softening component of the demulsifying agent may be prepared in any known or approved manner. Preferably the fatty acid is introduced into a suitable kettle and the alkali to saponify the same is added slowly and with stirring and under temperature conditions which are now well understood. If rosin is to make part of the soap it may be introduced with the fatty acid and the mixture heated until the rosin is completely dissolved. If a fatty material is to be introduced into the compound it is preferably introduced in the kettle before saponification of the fatty acid. Preferably, I employ ricinoleic acid and, if fatty matters are to be added, castor or other low-test fixed oil in order to produce a liquid rather than a solid or semi-solid compound. For the same reason, I prefer to form an ammonium soap of the fatty acid or fatty acid and rosin. In forming the ammonium soap, strong ammonium hydroxide (preferably the commercial 26 degree Bé. aqua ammonia) is added slowly with stirring of the mass, meanwhile cooling the mixture if the temperature tends to rise unduly. At temperatures in excess of 100° F. there is unnecessary loss of ammonia by evaporation. If too much water is added with the ammonia, there is a tendency to jell.

To prepare the furfural hydrogen potassium sulfite solution, I dissolve 25 parts by weight of potassium meta bi-sulfite (56.4% available $SO_2$), in granulated form, in 38 parts by weight of water heating slightly to get complete solution of the salt. To this solution after cooling I then add slowly with stirring, 21.8 parts by weight of furfural (technical, 97%), cooling when necessary to prevent too rapid rise in temperature. The amount of furfural required is calculated from the available $SO_2$ in the bi-sulfite and the purity of the furfural, which latter is determined by chemical tests. If other aldehyde or ketone alkali hydrogen sulfite solution is to be used in the demulsifier, the preparation thereof will be modified in an obvious manner from that above described. But if the reaction product is insoluble or difficultly soluble in water, as in the case of benzaldehyde alkali hydrogen sulfite, it will be precipitated and may be removed by filtering and drying, then dissolved in the soap solution in the proportion by weight desired. If the hydrogen sulfite solution is not readily soluble in the soap, its solution may be expedited by the addition of a small quantity of additional solvent, such as commercial alcohol, to the mixture. Also, if desired, the filtration and drying steps may be omitted, and the mixture of hydrogen sulfite compound and the excess water added to the soap solution, together with sufficient alcohol or other solvent, if necessary, to afford complete mixability with the soap. In any event, I prefer to use sufficient aldehyde or ketone to completely combine with the sulfite salt, as excess sulfite seems to have a tendency to cause the emulsion to sludge down without water separation. But slight excess of aldehyde or ketone appears not to cause any harmful effects in the treatment of the emulsion.

In preparing the composition the water softening agent proper and the furfural potassium hydrogen sulfite solutions were separately prepared in the above indicated manner and the two resulting materials mixed together with cyclohexanol.

A specific example of a demulsifying composition according to my invention which I have used successfully in the demulsification of oils contained the following ingredients in the proportions given by weight:

| | |
|---|---|
| Ammonium ricinoleate | 50.22 |
| Free ammonia ($NH_3$) | 1.91 |
| Furfural potassium hydrogen sulfite | 3.20 |
| Castor oil | 20.45 |
| Cyclohexanol | 12.05 |
| Water | 12.09 |
| Impurities | 0.08 |

This composition was made from the following materials in the proportions by volume given below:

| | |
|---|---|
| Furfural potassium hydrogen sulfite solution (prepared as above indicated) | 4.0 |
| Ricinoleic acid | 48.8 |
| Aqua ammonia (26° Bé.) | 14.7 |
| Castor oil | 20.3 |
| Cyclohexanol | 12.2 |

The composition was formed from the materials tabulated in the manner above described by separately preparing the furfural potassium hydrogen sulfite solution, separately preparing the water softening materials proper from the ricinoleic acid, aqua ammonia and castor oil, and mixing the products of the two operations with cyclohexanol to form the complete demulsifying composition.

As an instance of the use of my improved compound in breaking a difficultly resoluble emulsion, I have successfully treated cut oil, using one gallon of the above specified compound to 392 barrels of oil produced. No intermediate layer was noticeable at the interface between the oil and brine and the oil produced in the storage tank was free from haze.

While I prefer to use ricinoleic acid for forming the soap, because of the fluidity of the product, and ammonia as the saponifying agent, other soap-forming acids and alkalis may be employed. The castor oil, as given in the above formula, may be increased, diminished, or omitted altogether, or other fatty materials may be substituted therefor.

In the above specific formula an amount of ammonia was used largely in excess of that required to saponify the acids and as a consequence the compound was strongly basic, which seemed to be of substantial advantage in the treatment of this particular cut oil. However, with other cut oils a less basic or neutral compound may be desirable. The amount of cyclohexanol also may be varied, dependent upon the contents of alkali earth salts found in the oil treated. Obviously, the cyclohexanol may be introduced into the mixing kettle prior to saponification, if desired. Moreover, the proportion of aldehyde or ketone alkali hydrogen sulfite to the other ingredients may be varied from about one-third to twice that of the specific example.

I claim:

1. The process of breaking petroleum emulsions which comprises subjecting the emulsion to the action of a reagent including a water soluble soap and cyclohexanol.

2. A process of breaking petroleum emulsions which comprises subjecting the emulsion to the action of a reagent including a water soluble soap, cyclohexanol and an alkali hydrogen sulphite of a compound of the group consisting of aldehydes and ketones.

3. The process of breaking petroleum emulsions which comprises subjecting the emulsion to the action of a reagent including a water soluble soap, a fatty material and cyclohexanol.

4. The process of breaking petroleum emulsions which comprises subjecting the emulsion to the action of a reagent including a water soluble soap, a fatty material, cyclohexanol and an alkali hydrogen sulphite of a compound of the group consisting of aldehydes and ketones.

HAROLD JAY ROBERTSON.